(12) United States Patent
Russell et al.

(10) Patent No.: US 6,234,102 B1
(45) Date of Patent: May 22, 2001

(54) DEFLECTOR

(75) Inventors: Michael John Russell, New Milton (GB); Erik Godøy, Bødalen (NO)

(73) Assignee: Petroleum Geo-Services AS, Lysaker (NO)

( * ) Notice: Subject to any disclaimer, the term of this patent is extended or adjusted under 35 U.S.C. 154(b) by 0 days.

(21) Appl. No.: 09/322,386

(22) Filed: May 28, 1999

(30) Foreign Application Priority Data

Dec. 6, 1996 (NO) .................................................. 96.5214
Nov. 14, 1997 (WO) .................................. PCT/NO97/00302

(51) Int. Cl.[7] .................................................. B63B 21/04
(52) U.S. Cl. ........................................... 114/253; 367/15
(58) Field of Search ..................... 114/253, 245, 114/244, 246; 367/15, 17

(56) References Cited

U.S. PATENT DOCUMENTS

| Re. 18,122 | | 7/1931 | Fletther . |
| 4,130,078 | * | 12/1978 | Cholet .................................. 114/244 |
| 4,323,989 | * | 4/1982 | Huckabee et al. ...................... 367/17 |
| 4,630,997 | | 12/1986 | Cousteau et al. . |
| 4,729,333 | | 3/1988 | Kirby et al. . |
| 4,890,568 | * | 1/1990 | Dolengowski ....................... 114/246 |
| 5,357,892 | * | 10/1994 | Vatne et al. ........................... 114/244 |
| 5,532,975 | * | 7/1996 | Elholm .................................. 367/16 |

FOREIGN PATENT DOCUMENTS

| 0562780 A1 | 9/1993 | (EP) . |
| 2293806 | 10/1996 | (GB) . |
| 177248 | 9/1995 | (NO) . |

\* cited by examiner

*Primary Examiner*—S. Joseph Morano
*Assistant Examiner*—Ajay Vasudeva
(74) *Attorney, Agent, or Firm*—Arnold & Associates

(57) ABSTRACT

A deflector for towing behind a vessel, especially for use in relation to seismic surveys, being adapted to pull equipment to a transversal position in relation to the moving direction of the vessel, comprising at least one connection point for connecting, through wires or similar, to the vessel and the equipment to be towed. Two or more deflector wings are adapted to provide the deflector with a lifting force transversally in relation to the moving direction of the vessel, at least one of the wings being provided with a rotating cylinder positioned in front of the wing adapted to increase the lift of the deflector wing, and a drive unit for driving the rotating cylinder with corresponding devices for power supply.

9 Claims, 2 Drawing Sheets

DEFLECTOR

This invention relates to a deflector for towing after a vessel, especially for use in seismic surveys at sea, being adapted to pull equipment to a transversal position in relation to the vessel's moving direction, comprising at least one connecting point for coupling, through wires or similar, to the vessel and the equipment to be towed, and two or more deflector wings adapted to provide a lifting force transversally in relation to the direction of the vessels movement.

In seismic studies at sea acoustic sources are used being mounted in or close to a vessel, and directing acoustic signals toward the sea floor. Reflections of these signals are received by a number of receivers being positioned in seismic cables being towed behind the vessel. These cables are spread out to a relative width to provide measurements of the geological conditions over an area with a certain width. As the use of the seismic vessel is expensive it is advantageous to make the width of the tow as large as possible, with a large number of seismic cables, so that one single pass over the area to be measured covers as large an area as possible. To spread the seismic cables transversally in relation to the seismic vessel deflectors are usually used.

Such deflectors are traditionally passive devices comprising one or more wings providing a lift in the required direction. Because of the towing resistance in the water, caused both by the deflector and the towed cables, there are, however, limits to the lift which may be obtained using passive deflectors, which in turn, together with a wish in seismic studies to keep the seismic cables as close to the vessel as possible, limits how far the deflectors may be pulled transversally. When the deflector is used in seismic surveys it will in addition be loaded with the seismic cable to be pulled sideways. Today there is a limit to the width of the cable tow with passive deflectors being approximately 800 meters, with approximately 10 seismic cables.

In relation to passive deflectors it is known that the largest effect is obtained using one single wing. This solution is, however, very unstable, which is a disadvantage in seismic surveys, where it is important to keep the seismic cables in the correct position and also to keep them separated to avoid damage on the equipment being mounted on the cables.

Many types of active systems have been suggested in different occasions to obtain a lift, e.g. using the so-called Magnus effect. This means that a rotating cylinder being moved in a medium with the axis of the cylinder moving perpendicular to the axis of the cylinder will experience a lift. The lift pulls in the direction of movement of the part of the cylinder facing the flow. This effect has been suggested in many applications, such as shown in U.S. Pat. No. Re 18.122 (Flettner). A disadvantage related to active deflectors is that they are dependent on power supplies. If the power supply fails the lift is lost, in seismic surveys making it impossible to keep the seismic cables separated, with resulting damages on equipment and cables.

It is an object of the present invention to provide a stable deflector with an increased lifting ability, and which does not loose its lift in case of failure in the power supply. This is obtained using a deflector as defined above and characterized as given in claim 1.

The invention provides an active deflector which, depending on its dimensions, may double the width of the seismic survey, and thus halve the number of passes of the vessel over the area to be surveyed. Possibly the deflector according to the invention may be used in surveys with ordinary widths, where the dimensions are reduced, so that the towing resistance from the system is reduced. Because of the shape of the cylinder it will not affect the passive lifting capability of the deflector significantly, so that the seismic cables are kept at a certain distance from each other even if the power supply fails, and damages on the seismic cables are reduced.

The use of a number of wings in the deflector will also make the deflector more stable than previously known deflectors.

The invention will be described more in detail referring to the accompanying drawings, showing an example of an embodiment of the deflector according to the invention.

Figure 1:
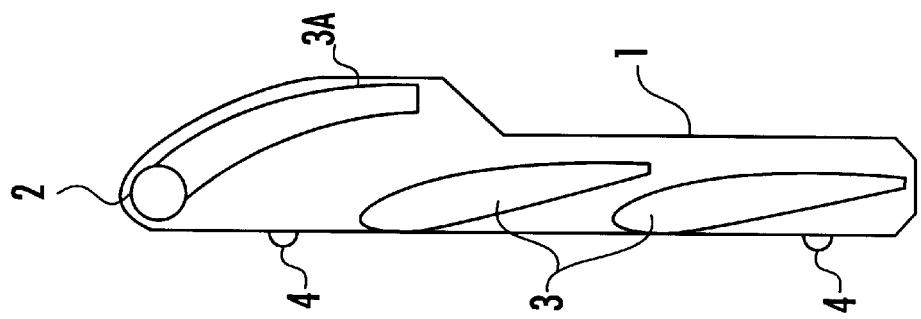
FIG. 1 shows a section of the deflector, seen from above.

In FIG. 1 a section of a deflector according to the invention is shown comprising the three wings 3,3a and a rotating cylinder 2 in the front of the foremost wing 3a. The deflector also comprises two connecting points 4 for coupling to the towing vessel 7, and to the towed equipment 2.

As mentioned, the rotating cylinder 2 is, in the Figure, positioned in front of the foremost wing, which is the position providing the greatest effect in the illustrated example. Other systems in which a smaller wing is positioned in front of this for stability purposes may of course also be contemplated. Rotating cylinders may also be mounted in the other wings to improve the lift even further.

The cylinder described here may, however, be shaped in different ways, with a constant diameter along their complete axis or with a varying diameter preferably adapted to the shape of the associated wing. The wing and the cylinder are preferably adapted to each other so that they together constitute a deflector wing having a certain lift when the cylinder is not activated.

The cylinder may be driven in different ways, e.g. using hydraulic or electrical engines. The rotational velocity of the cylinder may be controlled in a simple way to adjust the lift of the deflector.

Figure 2:
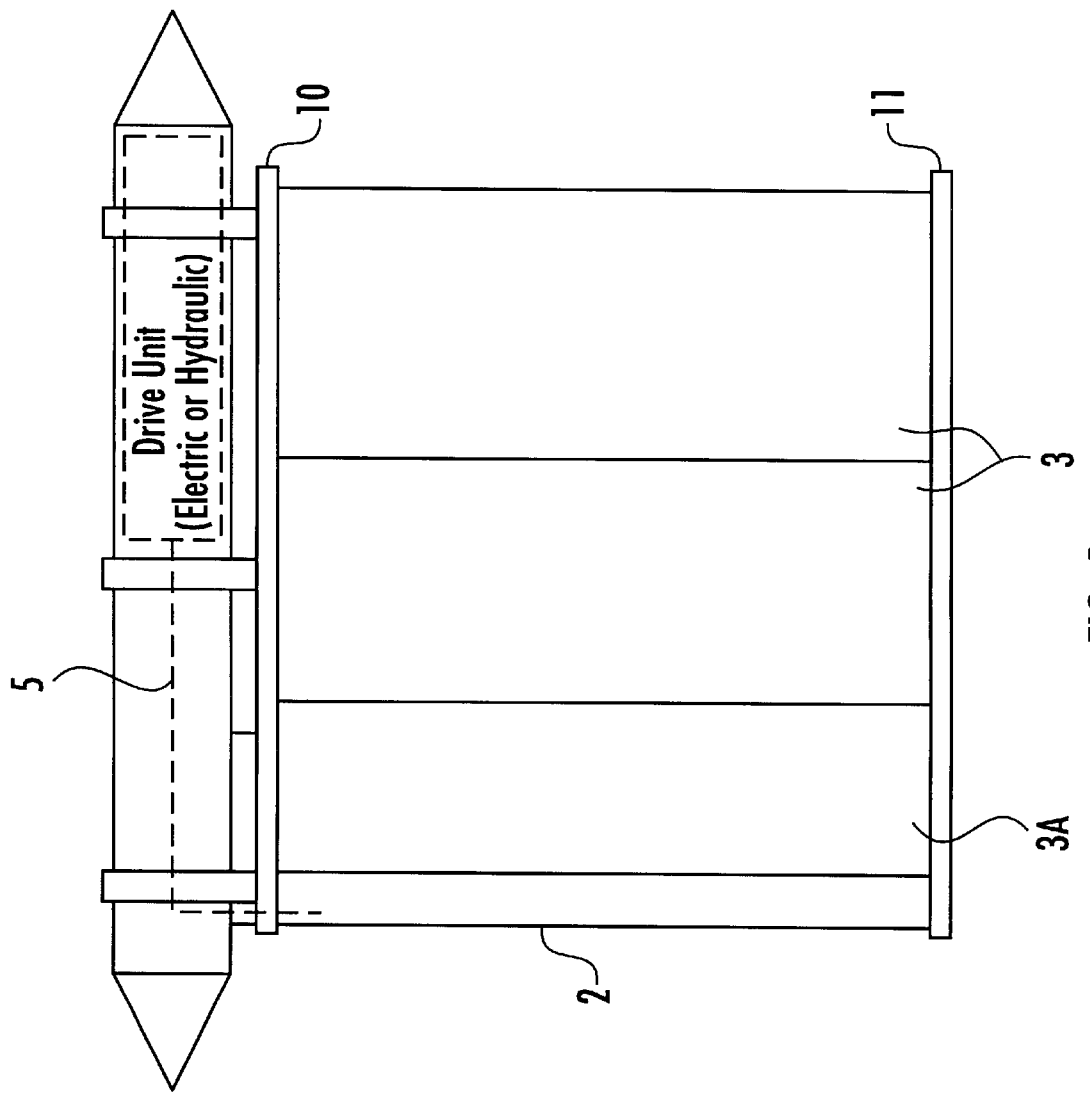
FIG. 2 shows the deflector seen from one side.

FIG. 2 shows the deflector as seen from one side, being equipped with upper and lower fastening devices or plates 10, 11, respectively on the upper and lower sides connecting the wings 3a, 3 to each other, and also a container 5 on the upper side. The container 5 may contain different control mechanisms, drive units for the cylinder(s) and, in some cases, power supplies for the cylinder(s). It may also comprise a buoyancy tank for keeping the deflector in a required position in relation to the surface. The latter may also be obtained using additional wings (not shown) being capable of steering the deflector to a certain depth.

Figure 3:
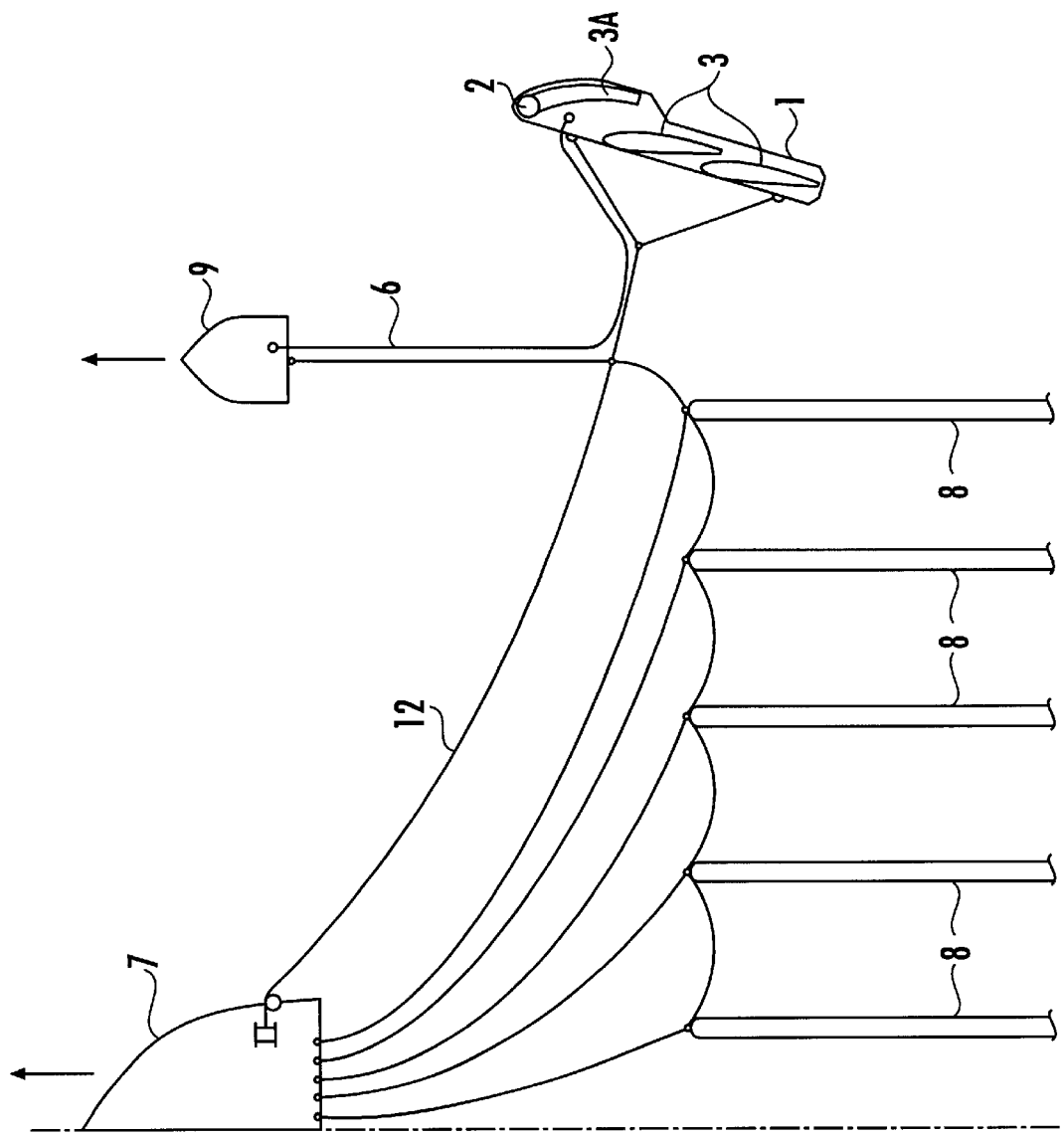
FIG. 3 shows the deflector incorporated in a system comprising two vessels and a number of seismic cables.

Usually the operation of the cylinder is too power consuming to allow the power supply to be kept on board the deflector. Thus it is necessary to provide power to the deflector from the towing vessel 7 or, as shown in FIG. 3, in a cable 6 from a separate support vessel 9. A problem related to the transferring of power from the towing vessel 7 is that a cable stretching over the relatively long transversal distance between the towing vessel and the deflector will give a substantial contribution to the towing resistance of the system. Also, the cable will be subject to considerable strain thus increasing the chances for failures to arise.

The support vessel 9 may provide electrical or hydraulic power through the cable, in addition to control signals or the like for controlling the deflector. Also the support vessel may provide a certain towing force which may contribute in increasing the distance, perpendicular to the moving direction, between the towing vessel and the deflector. The support vessel 9 may preferably be remote controlled so that the position relative to the towing vessel is controlled continuously. In the same way the positions of the deflectors in relation to the towing vessel may be remote controlled via the support vessel and a cable 6 stretching from the support vessel 9 to the deflector 1. The support vessel should, however, be manned to be able to provide maintenance and repairs on board regardless of weather conditions. In seismic surveys the support vessels may also be equipped with seismic sources or receivers to contribute to the data acquisition in the survey.

FIG. 3 also shows a number of seismic cables, comprising seismic receivers and/or sources, being towed behind the towing vessel. Using conventional deflectors the width of such may be up to 800 meters with 10 cables. Using a deflector according to the invention this width may be increased to 2000 meters, with 18 cables 8. This means considerable reductions in expenses, which allows for the use of the support vessels. At the same time the deflectors characteristics as a passive deflector avoids a total collapse of the spread of the search, so that the cables do not come close to each other and damaged, and the seismic survey in some cases may be continued, but to a limited extent.

The construction of the couplings between the towing wires, power supplies, deflectors and vessels may comprise any solution and are not relevant to this invention.

As mentioned above the drawings show one of many different embodiments of the invention. Even if the shown embodiment with three wings, the first of which being equipped with a cylinder, is the preferred embodiment at the present, other combinations of wings and cylinders may turn out to be better. Simple variations, such as other connections between the deflector and the rest of the components in the tow than the shown connection points 4 with a more direct coupling between the deflector and the support vessel, may of course, with the necessary structural changes and reinforcements, be done within the scope of this invention.

It is also clear that the invention, although here described in relation to seismic surveys, may be used in other types of tows, such as fishing equipment.

What is claimed is:

1. A deflector for towing after a vessel for use in relation to seismic surveys, being adapted to pull equipment to a transversal position in relation to the moving direction of the vessel, the deflector comprising:

at least one connection point for connecting, through wires to the vessel and the equipment to be towed;

two or more deflector wings adapted to provide the deflector with a lifting force transversally in relation to the moving direction of the vessel;

at least one of the wings being provided with a rotating cylinder positioned in front of the wing adapted to increase the lift of the deflector wing; and a drive unit for driving the rotating cylinder, the drive unit having a power supply associated therewith.

2. Deflector according to claim 1, characterized in that the deflector includes three wings comprising a foremost wing and two trailing wings, the foremost deflector wing being provided with the rotating cylinder in its front.

3. Deflector according to claim 1, characterized in that one or more rotating cylinders are driven by one or more electrical engines.

4. Deflector according to claim 1, characterized in that one or more rotating cylinders are driven by one or more hydraulic drive units.

5. Deflector according to claim 1, characterized in that the deflector wings are interconnected by at least one fastening device, including an upper fastening device, and that the upper fastening device is provided with drive units for the rotating cylinder(s).

6. Deflector according to claim 5, characterized in that the upper fastening device includes buoyancy and control units.

7. Deflector according to claim 1, characterized in that the deflector includes connecting means for connecting to a support vessel adapted to pull the deflector in a direction parallel to the direction of movement of the support vessel.

8. Deflector according to claim 7, characterized in that the power supply comprises cables connected in their opposite ends to the support vessel and to the deflector for providing the deflector with power.

9. Deflector according to claim 7, is whereby the deflector is adapted to connect to the support vessel by a towing wire.

\* \* \* \* \*

UNITED STATES PATENT AND TRADEMARK OFFICE
CERTIFICATE OF CORRECTION

PATENT NO. : 6,234,102 B1
DATED : May 22, 2001
INVENTOR(S) : Russell et al.

Page 1 of 1

It is certified that error appears in the above-identified patent and that said Letters Patent is hereby corrected as shown below:

Column 1,
Line 10, "vessels movement." should read -- vessel's movement. --.
Line 23, "seismic vessel deflectors" should read -- seismic vessel, deflectors --.

Column 3,
Line 15, "such may" should read -- such a search may --.

Claim 9,
Line 1, "claim 7, is whereby" should read -- claim 7, whereby --.

Signed and Sealed this

Twelfth Day of February, 2002

Attest:

JAMES E. ROGAN
Attesting Officer     Director of the United States Patent and Trademark Office